Sept. 22, 1959  G. B. DUNN, JR  2,905,840
THREE PHASE INDUCTION MOTOR WINDING
Filed July 16, 1957  5 Sheets-Sheet 1

Inventor:
George B. Dunn Jr,
by His Attorney.

Inventor:
George B. Dunn, Jr;
by His Attorney.

Sept. 22, 1959  G. B. DUNN, JR  2,905,840
THREE PHASE INDUCTION MOTOR WINDING
Filed July 16, 1957  5 Sheets-Sheet 3

Inventor:
George B. Dunn, Jr;
by His Attorney.

Sept. 22, 1959　　　G. B. DUNN, JR　　　2,905,840
THREE PHASE INDUCTION MOTOR WINDING
Filed July 16, 1957　　　5 Sheets-Sheet 4

Inventor:
George B. Dunn, Jr;
by
His Attorney.

United States Patent Office 2,905,840
Patented Sept. 22, 1959

2,905,840

THREE PHASE INDUCTION MOTOR WINDING

George B. Dunn, Jr., Fort Wayne, Ind., assignor to General Electric Company, a corporation of New York Application July 16, 1957, Serial No. 672,296

8 Claims. (Cl. 310—202)

This invention relates to dynamoelectric machines, and more particularly to electric motors of the induction type intended to be operated from a three phase source of alternating current power.

Induction-type electric motors normally include relatively rotatable primary and secondary core members, with the primary core member having a winding arranged on it connected to be energized from a suitable source of alternating current power. The forming of a suitable winding on the primary core member to provide the desired motor operating characteristics represents one of the more expensive items in the manufacture of the motor. This is particularly true in the case of three-phase motors where, in order to obtain suitable characteristics, it has long been found necessary in most cases to use a lap type winding. The forming and insertion of this type of winding is achieved considerably more slowly than where each phase pole is formed of a plurality of concentric coils, particularly where the insertion is a manual operation as is frequently the case. As a result, efforts have been made to bring the performance characteristics from concentric groups of coils to the level of the more familiar lap type winding in polyphase motors.

One major factor affecting performance is the effect of the spatial harmonics of the magnetomotive force. In particular, in three-phase motors, the 5th and 7th harmonics are most likely to cause difficulty in accordance with the observed fact that harmonics equal to twice the number of phases plus or minus one do the most harm, assuming the usual situation of one phase-belt per phase-pole. A desirable concentric-coil arrangement, which keeps the effect of the spatial harmonics down to a generally acceptable level, and where the total numbers of coils can be made less than the number of slots of the primary core member, is described as claimed in my Patent 2,796,543, issued on June 18, 1957, and assigned to the assignee of this invention; the arrangement of that application achieves results as good as an arrangement having the same number of coils as slots where, as has previously been true, all coils had the same number of turns so as to ensure equal slot fullness. However, in those cases where substantially total elimination of the most harmful spatial harmonics is required, it is desirable to retain a one coil per slot construction in the primary core member, and I have discovered that the desired slot fullness can be retained with coils of varying numbers of turns, and that within certain limits proper variation of the number of turns in the coils will achieve substantial elimination of the 5th and 7th harmonics in three-phase motors. In addition, I have found that this substantial reduction in the most harmful harmonics can be achieved without any substantial reduction in the primary magnetomotive force, and with an actual decrease in the electrical losses which would be found in an equivalent concentric winding with equal coils and having the same fundamental flux.

It is accordingly an object of this invention to provide an improved three-phase induction motor having an improved concentric-coil winding arrangement which incorporates the economies inherent in such an arrangement while providing the best possible operating characteristics.

A more specific object of the invention is to provide a three-phase winding arrangement which will permit the use of concentric coils with full slot utilization and substantial elimination of the 5th and 7th harmonics in a one coil per slot motor construction.

In one aspect, the invention provides a three-phase induction motor having P poles. The motor includes a primary core member which has S slots; windings are positioned on the core member in the slots, and are formed into S coils arranged in like groups of concentric coils, with the outer coil of each group spanning $$\frac{S}{P} - 1$$

teeth, as is conventional. The groups provide 3P phase poles of N coils each, with N representing the expression $$\frac{S}{3P}$$

Each phase pole group has its winding turns distributed so that, where $C_1$ equals the number of turns in the outermost coil, $C_2$ equals the number of turns in the next outermost coil, and so forth to $C_N$ which equals the number of turns in the innermost coil, the formulation $[C_1+C_N=C_2+C_{(N-1)}=C_3+C_{(N-2)}$, and so forth, $=K$, a constant] represents the turns relationship in the coils. Two coil sides from different phase pole groups, which between them have a total of K turns, are respectively positioned in each of the slots. In addition, in each phase pole group the outer half of the N coils which make up the group must have substantially greater total number of turns than the inner half. In the preferred construction, at least one and one half times as many turns are provided in the outer half of the N coils as in the inner half since partial analytical surveys have shown this to be a practical general limitation insofar as achievement of the improved properties is concerned.

The features of the invention which are believed to be novel are set forth with particularity in the appended claims. The invention itself, however, as to its organization together with further objects and advantages thereof, may best be understood by reference to the following description taken in connection with the accompanying drawings.

Figures 1, 2:
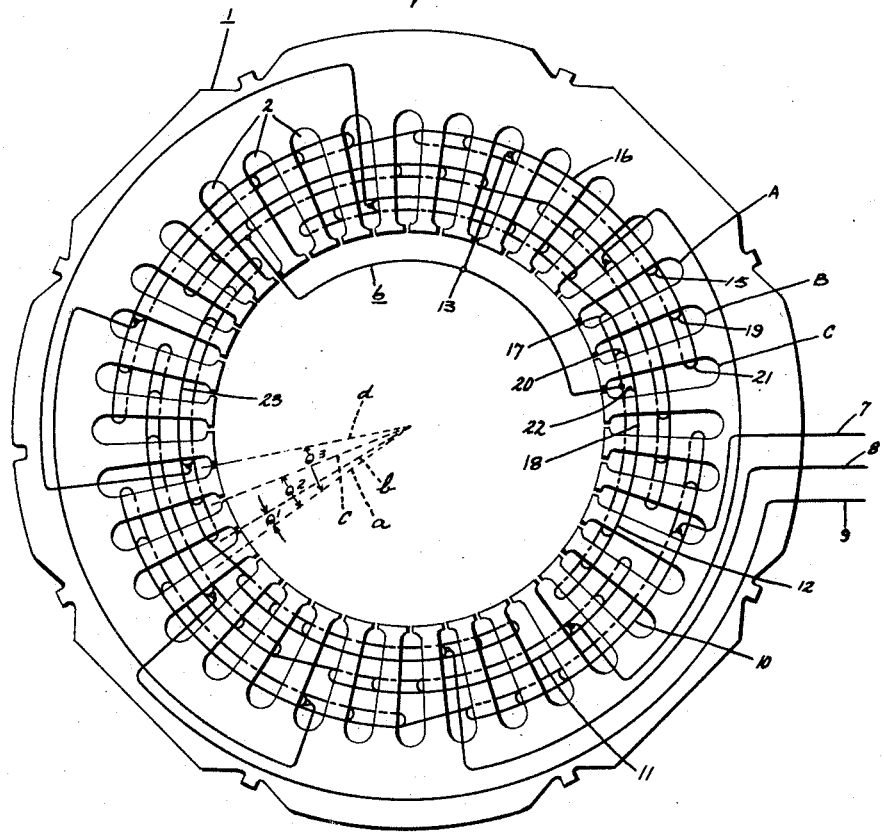
Figure 1 is a schematic view of a four-pole three-phase induction motor primary member (or stator) having the improved winding arrangement of the invention.
Figure 2 is a fragmentary view, partly in cross section, showing the distributed coil arrangement within the slots of the stator of Figure 1.
Figure 3:
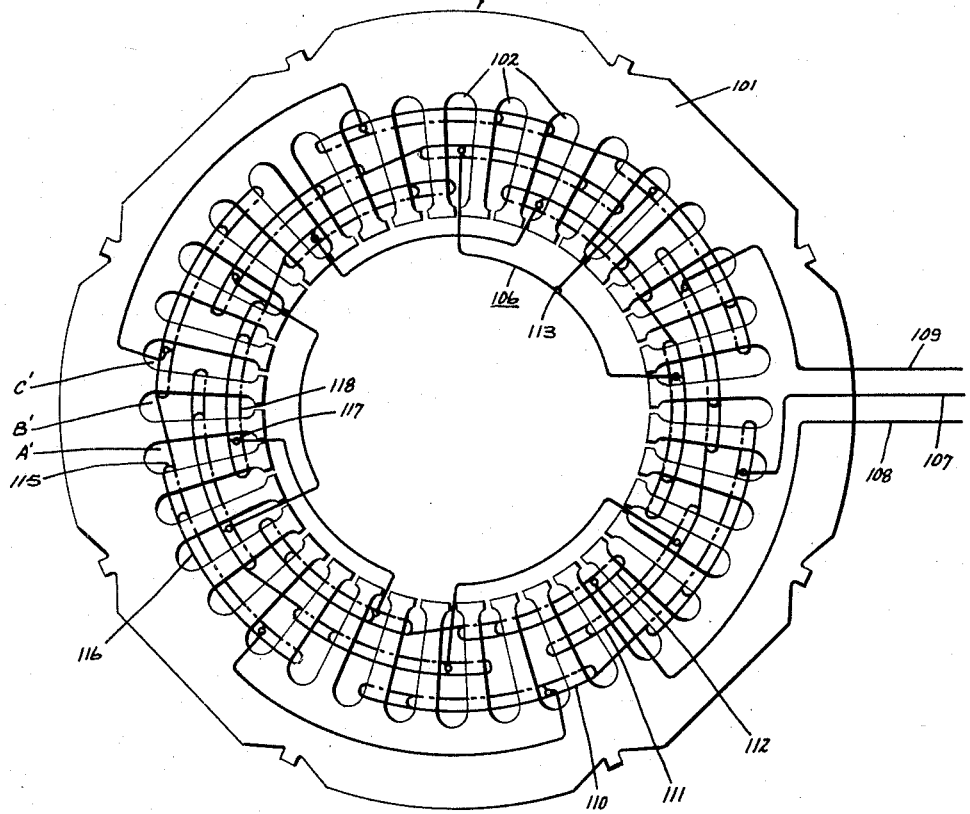
Figure 3 is a schematic view of a six pole three-phase induction motor stator having the improved winding arrangement of the invention.
Figure 4:
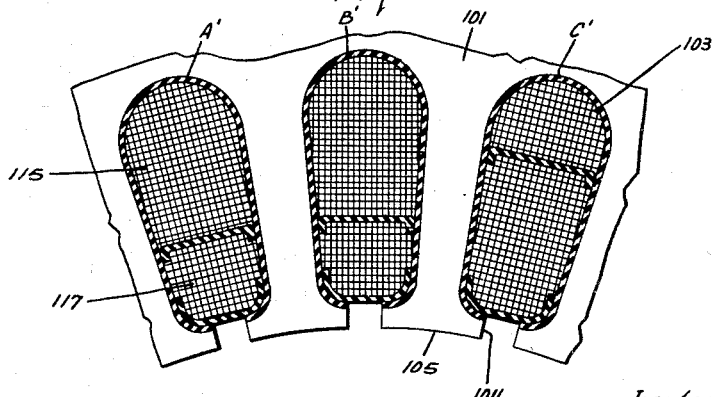
Figure 4 is a fragmentary view, partly in cross section, showing the distributed coil arrangement within the slots of the stator of Figure 3.

Referring now to Figures 1, 2, 5 and 6, a first specific embodiment of the invention will be described. An induction motor primary member, or stator, 1 is provided with a total of 36 slots 2. As may be seen in the enlarged view of Figure 2, each slot 2 is provided in the usual manner with a slot liner 3 for insulation purposes, and is formed with an opening 4 to the bore 5 of stator 1. Stator 1 has a winding 6 adapted to be connected across a source of three phase alternating current power (not shown) through conductors 7, 8, and 9. While a Y connected winding has been shown, with all three phase windings 10, 11 and 12 being connected together at point 13, it will be understood that other types of connections such as delta connections, well known to those skilled in the art, may be utilized for the three phase arrangement shown.

Each of the phase windings 10, 11 and 12 is arranged to provide four equal poles of three coils each. It will be readily observed that the number of phases times the number of poles times the number of coils per phase pole will equal the total number of coils on the core. To state the proposition mathematically, where N equals the number of coils per phase pole, S equals the number of slots, and P equals the number of poles, $$N = \frac{S}{3P}$$

in a three phase motor. Also, the outer coil of each phase-pole spans $$\frac{S}{P} - 1$$

teeth, in the usual manner.

There are shown in Figures 1 and 2 three particular slots of the stator core member 1, denoted respectively by the letters A, B, and C. As is true of each of the 36 slots 2, each of the slots A, B, and C has two coil sides positioned in it, preferably separated in a suitable manner by suitable between-phase insulation 14. The inner coil side 15 of a phase pole 16 and the outer coil side 17 of a phase pole 18 are positioned in slot A. In slot B, there are positioned center coil side 19 of phase pole 16 and center coil side 20 of phase pole 18. Slot C has the outer coil side 21 of phase pole 16 and the inner coil side 22 of phase pole 18. Although the number of turns per coil varies, as can readily be seen from a visual comparison of coils 15, 19, and 21 of phase pole 16, each of the slots is substantially equally filled with wire so as to effect full slot utilization. In order to achieve this result it is, of course, necessary for the same number of turns of wire to be present in each of the slots assuming, as is normally the case, that the same size wire is used in all coils. It will also be observed that in each case where an outer coil side of a given phase pole is positioned in a slot there is also an inner coil side of another phase pole in the same slot, and in each case where there is a center coil side of one phase pole in a slot there is also a center coil side of another phase pole in that slot. This can be developed into a general concept by stating that, where $C_1$ equals the number of turns in the outermost coil of each phase pole, $C_2$ equals the number of turns in the next outermost coil, and so forth to $C_N$ which equals the number of turns in the innermost coil, the expression $[C_1+C_N=C_2+C_{(N-1)}=C_3+C_{(N-2)}$ and so forth, $=K$, the constant number of turns per slot] represents the turns relationship required for complete slot utilization notwithstanding differences in the number of turns of the different coils. For the particular 3— coil arrangement in question, the expression becomes $C_1+C_3=2C_2=K$.

Figure 11:
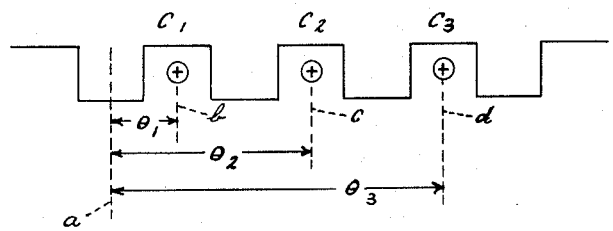
Figure 11 is a schematic illustration showing the method of determining the term S which represents the fundamental and space harmonic magnetomotive forces.

It will be recalled that it has been stated above that the unequal turns distribution of the of the coils in the slots is an important factor in achieving optimum motor performance including substantial elimination of the 5th and 7th space harmonics of magnetomotive force. The normal method of measuring the space harmonic magnetomotive force of a winding is by referring it to the fundamental magnetomotive force of the winding in terms of the pitch factor and the distribution factor of the winding. In other words the term $K_p K_d$ is used where $K_p$ is the pitch factor and $D_d$ is the distribution factor. This expression, in the case of the fundamental magnetomotive force, is $(K_p K_d)_f$; the numerical value of the expression is determined by the formula $$(K_p K_d)_f = \frac{\sum_{i=1}^{i=N} C_i \cos n\theta_i}{\sum_{i=1}^{i=N} C_i}$$

where C equals the number of turns in each coil and $\theta$ equals the electrical displacement of a slot from the junction of adjacent phase poles. This relationship may clearly be seen by reference to Figures 1 and 11; in each of these figures, line $a$ represents the junction of adjacent phase poles, line $b$ represents the center line of the slot in which is positioned the outermost coil side, line $c$ represents the center line of the slot for the second outermost coil side, and line $d$ represents the center line of the slot containing the innermost coil side of phase pole 23. These lines, then, determine $\theta_1$, $\theta_2$, and $\theta_3$ as shown. Substitution of the proper numbers for C and $\theta$ in the formula is then a simple matter, enabling one to determine the actual term $(K_p K_d)_f$ for any particular circumstance.

In the case of the $n$th harmonic, where the term becomes $(K_p K_d)_n$, the formula is $$(K_p K_d)_n = \frac{\sum_{i=1}^{i=N} C_i \cos n\theta_i}{\sum_{i=1}^{i=N} C_i}$$

Finally, in order to determine the ratio of the magnitude of the $n$th space harmonic of magnetomotive force to the fundamental magnetomotive force (or M.M.F.), the term $$\frac{(K_p K_d)_n}{n(K_p K_d)_f}$$

is used.

Figure 6:
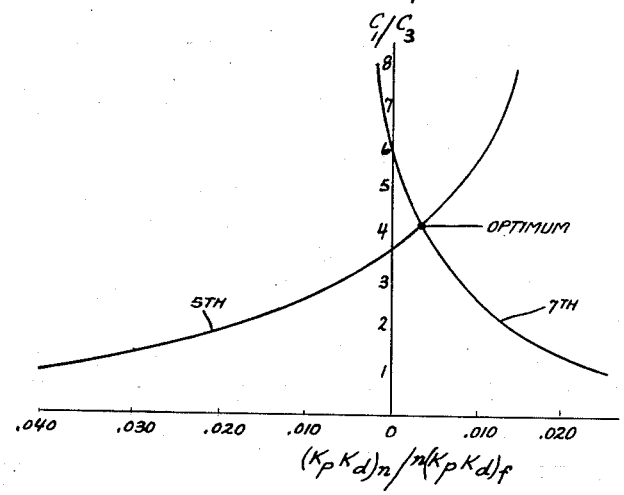
Figure 6 is a graph showing the extent of elimination of the 5th and 7th harmonics as the ratio of the outer to inner coil turns in the embodiment of Figures 1 and 2 is varied.

Referring now to Figure 6 the term $(K_p K_d)_n / n(K_p K_d)_f$ for the 5th and 7th harmonics has been plotted against the ratio of turns of the outer coil to the inner coil of each phase-pole group in Figure 1. One of the objects that will be recalled is the substantial elimination of the 5th and 7th harmonics, which are most likely to cause trouble in a three phase motor having one phase belt per phase pole. For practical purposes, substantial elimination of the harmonic magnetomotive forces is obtained when the $(K_p K_d)_n / n(K_p K_d)_f$ term is kept down to about .010 or .020, that is, as close to zero as is practically possible. It can be seen that for the 5th and 7th this occurs in this particular case starting at ratio of $C_1/C_3$ of about 1.9, with the 5th harmonic being the critical factor; the optimum point occurs at a ratio of about 4. However it will be understood that substantial elimination of the 5th and 7th harmonic forces is the primary object, and that the expected practical limit of .020 is not to be taken as an arbitrarily absolute limitation on the invention. Reference to Figure 6 shows that, from a ratio of $C_1/C_3$ of about 1.5, the 5th and 7th harmonics are effectively eliminated to a major extent and it is only below that ratio that considerable difficulty with them may be expected.

Figure 5:
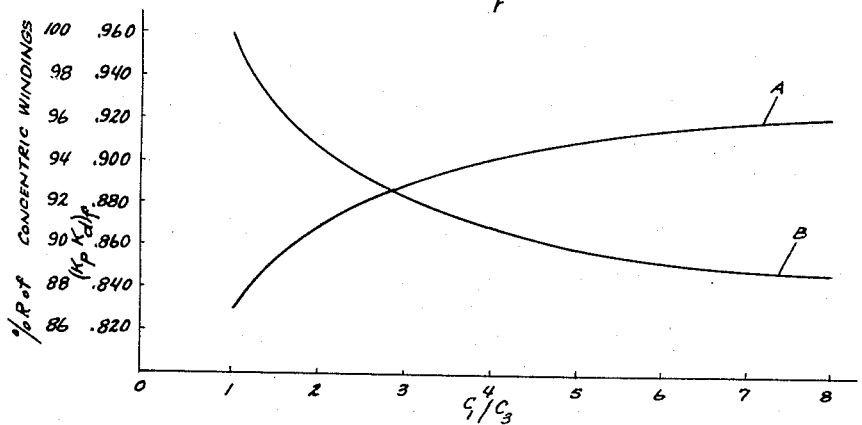
Figure 5 is a graph showing the variation of two different characteristics as the ratio of the outer coil turns to the inner coil turns in the three coil construction of Figures 1 and 2 is varied.

Referring now to Figure 5, curve A represents variations in the fundamental magnetomotive force factor, as represented by the term $(K_pK_d)_f$, with variations in $C_1/C_3$, and curve B represents the variation in winding resistance as the $C_1$ to $C_3$ ratio is varied; the 100% resistance point represents the resistance of a concentric winding having an equal number of turns in all coils. Reference to the $(K_pK_d)_f$ curve shows that as the ratio of $C_1$ to $C_3$ is increased, the fundamental magnetomotive force increases for a given total number of turns; at the 1.5 ratio the improvement is already substantial. This means that the minimum ratio indicated as acceptable for substantial elimination of the 5th and 7th harmonics also provides substantial improvement in the $(K_pK_d)_f$ factor over the case of equal turns in all coils. Referring to the other curve of Figure 5, it can be seen that the resistance decreases appreciably as the turns ratio of the coils departs from the previously used $C_1/C_3$ ratio of 1.0 and that at the 1.5 mark a substantial improvement is already noticeable. The curves of Figure 5 result from tests run on a motor having a stack length of 2⅜ inches and a mean slot diameter of 5¼ inches. However, it is to be understood that different dimensions will result in curves of the same general nature, i.e., the same general relationships will be present.

A review of Figures 5 and 6 teaches that the ratio of the outer coil turns to the inner coil turns should be at least 1.5 in order to achieve the desired substantial elimination of the 5th and 7th harmonic M.M.F. forces. At the present time, reference to Figure 6 in particular shows that as the ratio of the outer to the inner coil turns increases above 4, the harmonic M.M.F. forces increase again. For this reason, a $C_1/C_3$ of infinity, i.e., elimination of the inner coil, is not necessarily desirable since it decreases the effectiveness of the winding arrangement insofar as the elimination of the harmonics is concerned.

Referring now to Figures 3, 4, 7, and 8, another specific embodiment of the invention will be described. An induction motor stator 101 having a total of 36 slots 102 is provided. Each slot 102 is provided with a slot liner 103 for insulation purposes, and is formed with an opening 104 to the bore 105 of stator 101. The stator has a winding 106 adapted to be connected across a source of three phase alternating current power through conductors 107, 108, and 109; as before, for illustrative purposes, a Y-connected winding is shown with all three phase windings 110, 111, and 112 being connected together at point 113. Each phase winding is arranged to provide six equal poles of two coils each, totalling 36 coils for the 36 slots. With this construction each slot has two coils positioned in it. Referring to the slots marked A', B', and C' in particular, for illustration of the arrangement, it can be seen that slot A' has outer coil side 115 of phase pole 116 and inner coil side 117 of phase pole 118. Correspondingly, each of the other two slots B' and C' have both a large outer coil side and a small inner coil side. The sum of the turns of the outer and inner coils follows the same rule as set forth above, that is, it is substantially constant so that there is complete and equal slot utilization for all the slots of the stator core.

Figure 7:
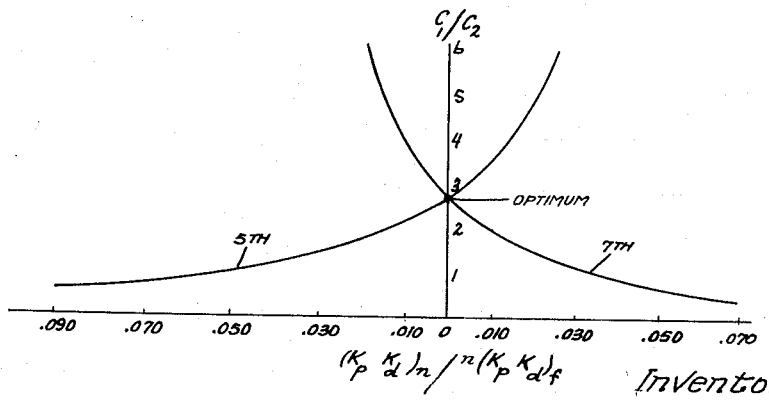
Figure 7 is a graph showing the degree of elimination of the 5th and 7th harmonics as the ratio of the outer to inner coil turns in the embodiment of Figures 3 and 4 is varied.

Referring to Figure 7, optimum elimination of both the 5th and 7th harmonic forces is obtained when $C_1/C_2$ equals about 2.7, and consequently, from the winding harmonics standpoint, this ratio constitutes the best possible arrangement for the two coil construction. Again, however, it can be seen that substantial elimination is obtained if the ratio is maintained at a level of at least 1.5 to 2. While the curve extends only up to a ratio of about 6, it can be seen that decreasing effectiveness in elimination of harmonics is obtained as the ratio goes above 2.7.

Figure 8:
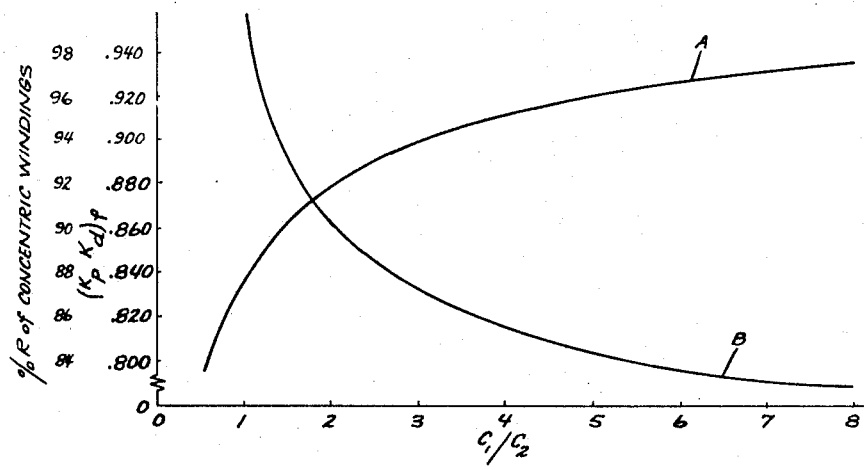
Figure 8 is a graph showing variation of two characteristics as the ratio of turns of the outer and inner coils in the embodiment of Figures 3 and 4 is varied.

Referring to Figure 8, the curves showing the winding resistance and the term denoting the fundamental magnetomotive force are indicated as before by "B" and "A" respectively. These characteristics are also substantially improved by the increased ratio of $C_1$ to $C_2$ over the arrangement which provided concentric windings having equal numbers of turns.

Figure 9:
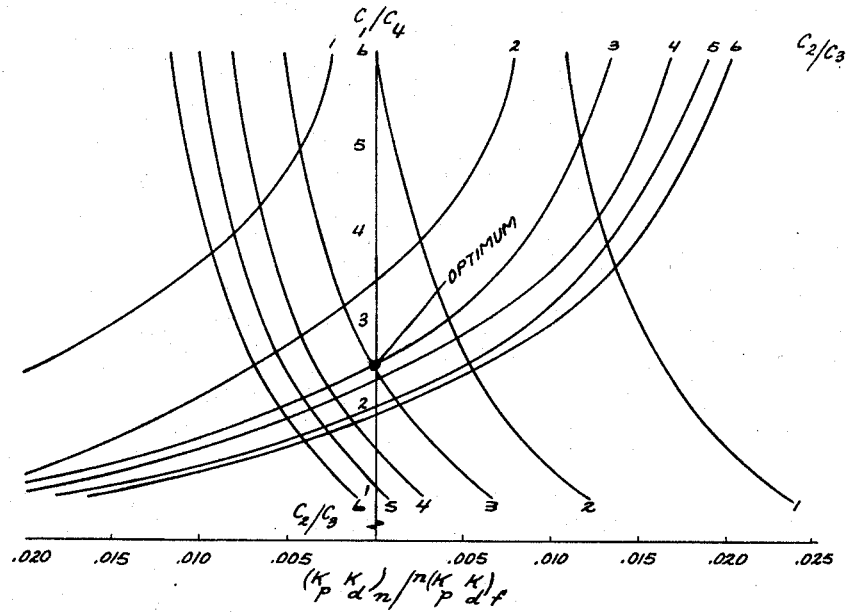
Figure 9 is a graph showing the degree of elimination of the 5th and 7th harmonics as the turns ratio is varied in a four coils per phase pole group construction.

Referring now to Figure 9, there is shown a series of curves illustrative of the degree of elimination of the 5th and 7th harmonic magnetomotive forces for varying relationships of the turns in the coils in a four coil per phase pole group arrangement. In such a group, in conformity with the examples which have been given before, a two pole winding would require a 24 slot stator; a four pole winding, a 48 slot stator; a six pole winding, a 72 slot stator, etc. In accordance with the invention as previously described, $C_1+C_4=C_2+C_3$, with $C_1$ and $C_4$ lying in the same slots and $C_2$ and $C_3$ lying in the same slots. In Figure 9 the curves which slant upwardly from left to right represent the 5th harmonic factors; each of them represents a different $C_2/C_3$ ratio as indicated by the numeral at the top of each curve, that is, the number of turns in the second outermost coil over the number of turns in the second innermost coil is given six different values. Similarly, the curves which slant upwardly from right to left represent the 7th harmonic factor, with the $C_2/C_3$ ratio indicated at the bottom of each curve.

The curves show that, in order to effect substantial elimination of the 5th and 7th harmonic M.M.F. forces a substantially greater number of turns in the outer half of the coils $(C_1+C_2)$ is necessary than in the inner half of the coils $(C_3+C_4)$. Thus, where the $C_1/C_4$ ratio is six to one, the $C_2/C_3$ ratio may be decreased down to 1.0 without undue adverse effect: there is still substantial elimination of the undesired harmonic forces. By the same token, as the $C_1/C_4$ ratio is decreased toward 1.0, it is necessary to increase the $C_2/C_3$ ratio to a relatively high level as can be seen by the relative positions of the curves 1 to 6 for the 5th and 7th harmonics. Optimum elimination of harmonic effect is obtained, as shown, when $C_2/C_3=3$ and $C_1/C_4=2.5$.

The partial analytical surveys conducted illustrate that the four coil phase pole group arrangement follows the same general rule as in the case of 3 and 2 coils per phase pole, that is, noticeable improvement is present if the outer half of the coils have a substantially greater number of turns than the inner half of the coils, with substantial elimination of the undesired forces when $$\frac{C_1+C_2}{C_3+C_4}$$

is on the order of 1.5 or more. As before, the fundamental magnetomotive force and the resistance were both improved over the conditions for a winding with equal turns in all concentric coils.

Figure 10:
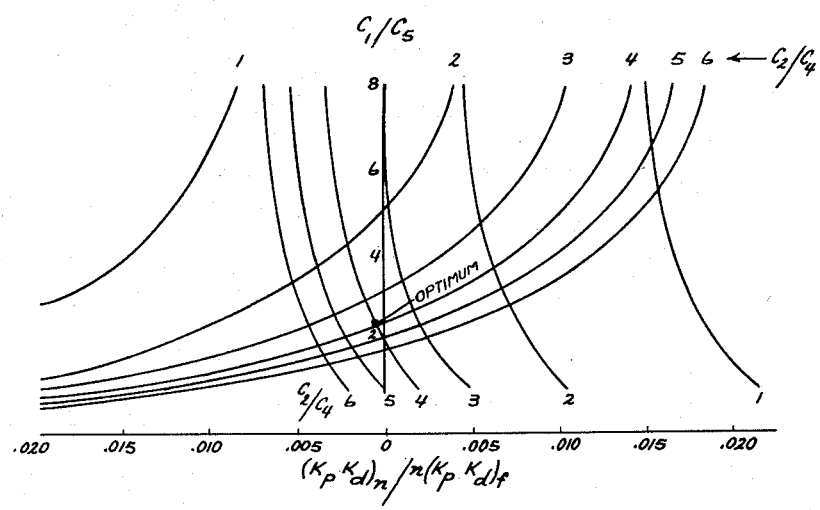
Figure 10 shows the variation in the degree of elimination of the 5th and 7th harmonics as the turns ratio in the coils is varied in a five coils per phase pole group construction.

In Figure 10 the degree of elimination of harmonic forces for varying coil relationships is shown in the same manner as in Figure 9. In this case, however, the relationship is provided for a five coils per phase pole group type of winding where, for instance, 30 slots are required for a two pole winding, 60 for a four pole winding, 90 for a six pole winding etc. Again it is clear that the same relationship as before prevails: the sum of turns in the outer coils should have a 1.5 ratio to the sum of the turns of the inner coils, i.e., $$\frac{C_1+C_2}{C_4+C_5}$$

equals at least 1.5. The optimum harmonic eliminating effect occurs when $C_2/C_4=4$ and $C_1/C_5=2.3$.

It will be seen from the foregoing that the provision of a winding arrangement in accordance with the invention provides complete and equal slot fullness for all the slots in a stator core where the same number of coils and slots is provided, together with substantial elimination of the more harmful harmonic forces.

While the invention has been explained by describing particular embodiments thereof, it will be apparent that improvements and modifications may be made without departing from the scope of the invention as defined in the appended claims.

What I claim as new and desire to secure by Letters Patent of the United States is:

1. A three phase induction motor having P poles including a primary core member having S slots, and windings positioned on said core member in said slots and formed into S coils arranged in like groups of concentric coils to provide 3P phase poles of N coils each where N equals $$\frac{S}{3P}$$

the outer coil of each group spanning $$\frac{S}{P}-1$$

teeth, each said phase pole group having the winding turns distributed so that, where $C_1$ equals number of turns in the outermost coil, $C_2$ equals number of turns in the next outermost coil, and so forth to $C_N$ which equals number of turns in the innermost coil, the expression $[C_1+C_N=C_2+C_{(n-1)}=C_3+C_{(N-2)}$ and so forth, $=K$ a constant] represents the turns relationship in the coils, two said coils from different phase pole groups respectively being positioned in each said slot and having a total of K turns, the other half of the N coils of each phase pole group having a substantially greater total of turns than the inner half thereof.

2. A three phase induction motor having P poles including a primary core member having S slots, and windings positioned on said core member in said slots formed into S coils arranged in like groups of concentric coils to provide 3P phase poles of N coils each where N equals $$\frac{S}{3P}$$

outer coil of each group spanning $$\frac{S}{P}-1$$

teeth, each said phase pole group having the winding turns distributed so that, where $C_1$ equals number of turns in the outermost coil, $C_2$ equals number of turns in the next outermost coil, and so forth to $C_N$ which equals number of turns in the innermost coil, the expression $[C_1+C_N=C_2+C_{(N-1)}=C_3+C_{(N-2)}$ and so forth, $=K$ a constant] represents the turns relationship in the coils, two said coils from different phase pole groups respectively being positioned in each said slot and having a total of K turns, the outer half of the N coils of each phase pole group having at least 1.5 times as many turns as the inner half thereon.

3. A three phase induction motor having P poles including a primary core member having S slots, and windings positioned on said core member in said slots and formed into S coils arranged in like groups of concentric coils to provide 3P phase poles of two coils each, the outer coil of each group spanning $$\frac{S}{P}-1$$

teeth, an inner coil from one phase pole group and an outer coil from another phase pole group being positioned in each said slot, the outer coil of each phase pole group having at least 1.5 times as many turns as the inner coil thereof.

4. A three phase induction motor having P poles including a primary core member having S slots, and windings position on said core member in said slots and formed into S coils arranged in like groups of concentric coils to provide 3P phase poles of two coils each, the outer coil of each group spanning $$\frac{S}{P}-1$$

teeth, an inner coil from one of said phase pole groups and an outer coil from a different one of said pole groups being positioned in each said slot, each outer coil having approximately 2.7 times as many turns therein as the inner coil thereof.

5. A three phase induction motor having P poles including a primary core member having S slots and windings positioned on said core member in said slots and formed into S coils arranged in like groups of concentric coils to for 3P phase poles of 3 coils each, the outer coil of each group spanning $$\frac{S}{P}-1$$

teeth, each said phase pole group having the winding turns distributed so that, where $C_1$ equals number of turns in the outermost coil, $C_2$ equals number of turns in the center coil, and $C_3$ equals number of turns in the innermost coil, the expression $[C_1+C_3=2C_2]$ represents the turns relationship in the coils, an outer coil from one phase pole group and an inner coil from another phase pole group being positioned in each of ⅔ of said S slots, two center coils from different phase pole groups being positioned in each of the other third of said S slots, the outer coil of each phase pole group having at least 1.5 times as many as the inner coil thereof.

6. A three phase induction motor having P poles including a primary core member having S slots, and windings positioned on said core member in said slots and formed into S coils arranged in like groups of concentric coils to provide 3P phase poles of three coils each, the outer coil of each group spanning $$\frac{S}{P}-1$$

teeth, each said phase pole group having the winding turns distributed so that, where $C_1$ equals the number of turns in the outer coil, $C_2$ equals number of turns in the center coil and $C_3$ equals number of turns in the inner coil, the expression $[C_1+C_3=2C_2]$ represents the turns relationship in the coils, an outer coil from one phase pole group and an inner coil from another phase pole group being positioned in each of ⅔ of said S slots, two center coils from different phase pole groups being positioned in each of the other ⅓ of said S slots, the outer coil of each phase pole group having approximately 4 times as many turns as the inner coil thereof.

7. A three phase induction motor having P poles including a primary core member having S slots, and windings positioned on said core member in said slots and formed into S coils arranged in like groups of concentric coils to provide 3P phase pole groups of four coils each, the outer coil of each group spanning $$\frac{S}{P}-1$$

teeth, each said phase pole group having the winding turns distributed so that, where $C_1$ equals number of turns in the outermost coil, $C_2$ equals number of turns in the next outermost coil, $C_3$ equals number of turns in the next coil, and $C_4$ equals number of turns in the innermost coil, the expression $[C_1+C_4=C_2+C_3=K$, a constant] represents the turns relationship in the coils, two said coils from different phase pole groups respectively being positioned in each said slot and having a total of K turns, the ratio of $C_1$ to $C_4$ being approximately 2.5 and the ratio of $C_2$ to $C_3$ being approximately 3.

8. A three phase induction motor having P poles including a primary core member having S slots, and windings positioned on said core member in said slots and formed into S coils arranged in like groups of concentric coils to provide 3P phase pole groups of five coils each, the outer coil of each group spanning $$\frac{S}{P}-1$$

teeth, each said phase pole group having the winding turns distributed so that, where $C_1$ equals number of turns in the outermost coil, $C_2$ equals number of turns in the next outermost coil, and so forth to $C_5$ which equals the number of turns in the innermost coil, the expression $[C_1+C_5=C_2+C_4=2C_3=K$, a constant] represents the turns relationship in the coils, two said coils from different phase pole groups respectively being positioned in each said slot and having a total of K turns, the ration of $C_1$ to $C_5$ being approximately 2.3, the ratio of $C_2$ to $C_4$ being approximately 4.

References Cited in the file of this patent
UNITED STATES PATENTS

| | | |
|---|---|---|
| 2,783,403 | Schumaier | Feb. 26, 1957 |
| 2,796,543 | Dunn | June 18, 1957 |